United States Patent [19]
Osborn

[11] Patent Number: 5,484,257
[45] Date of Patent: Jan. 16, 1996

[54] WIND ENERGY DEVICE

[76] Inventor: Norbert L. Osborn, 1012 Meadowcreek Dr., #1154, Irving, Tex. 75038

[21] Appl. No.: 384,135

[22] Filed: Feb. 6, 1995

[51] Int. Cl.$^6$ .................................................. F03D 5/00
[52] U.S. Cl. .................... 415/2.1; 416/9; 416/55; 416/85
[58] Field of Search .............................. 415/2.1, 4.1, 4.2, 415/4.3, 4.4, 4.5, 7, 220, 126, 149.2; 416/9, 10, 54, 55, 85; 244/150, 58, 199, 207, 208

[56] References Cited

U.S. PATENT DOCUMENTS

| | | |
|---|---|---|
| 969,587 | 9/1910 | Williams . |
| 1,312,021 | 8/1919 | Dickinson et al. . |
| 2,036,560 | 4/1936 | Backus . |
| 2,118,127 | 5/1938 | Wulle . |
| 2,555,807 | 6/1951 | Morris . |
| 2,693,922 | 11/1954 | Ellison et al. . |
| 2,706,255 | 4/1955 | Breaux et al. . |
| 2,932,370 | 4/1960 | Kraus et al. . |
| 3,176,775 | 4/1965 | Clemens . |
| 3,301,927 | 1/1967 | Exley et al. . |
| 3,305,196 | 2/1967 | Hanlon . |
| 3,339,078 | 8/1967 | Crompton . |
| 3,455,594 | 7/1969 | Hall et al. . |
| 3,832,853 | 9/1974 | Butler, Jr. . |
| 3,883,750 | 5/1975 | Uzzell, Jr. . |
| 3,936,652 | 2/1976 | Levine . |
| 3,938,907 | 2/1976 | Magoveny et al. . |
| 3,944,840 | 3/1976 | Troll . |
| 3,987,987 | 10/1976 | Payne et al. ............................. 416/9 |
| 4,045,144 | 8/1977 | Loth ...................................... 415/4.5 |
| 4,088,419 | 5/1978 | Hope et al. ............................ 415/4.4 |
| 4,162,410 | 7/1979 | Amick . |
| 4,288,200 | 9/1981 | O'Hare .................................. 416/9 |
| 4,477,040 | 10/1984 | Karanik . |
| 4,508,973 | 4/1985 | Payne . |

FOREIGN PATENT DOCUMENTS

| | | | |
|---|---|---|---|
| 880130 | 3/1943 | France ................................. 415/2.1 |
| 2941222 | 4/1981 | Germany ............................. 415/4.5 |
| 1409771 | 7/1988 | U.S.S.R. ............................... 415/2.1 |
| 1682619 | 10/1991 | U.S.S.R. ............................... 416/9 |

OTHER PUBLICATIONS

"Vertical–Vortex Wind Turbine Proposed", Warren C. Wetmore, *Aviation Week & Space Technology*, Mar. 1, 1976, pp. 50–51.

*Primary Examiner*—Edward K. Look
*Assistant Examiner*—James A. Larson
*Attorney, Agent, or Firm*—Ross, Clapp, Korn & Montgomery

[57] ABSTRACT

A device for generating rotating shaft power from atmospheric air includes an airfoil. A partition is disposed within the airfoil along the length thereof. The partition forms an upper chamber and a lower chamber within the airfoil. The partition includes an aperture creating a fluid communication path between the upper and lower chambers. The leading edge of the airfoil includes an aperture disposed adjacent to the lower chamber. The top surface of the airfoil includes an aperture disposed adjacent to the upper chamber. A turbine is disposed within the partition aperture, and is adapted to be driven by fluid pressure entering the leading edge aperture of the airfoil and exiting the top surface aperture of the airfoil.

12 Claims, 2 Drawing Sheets

WIND ENERGY DEVICE

BACKGROUND OF THE INVENTION

The use of wind energy to provide power is a practice which dates back several hundred years. One of the earliest attempts to harness the force of winds resulted in the production of windmills. In the more recent energy conservation minded times, various efforts have been expended in attempting to develop more efficient wind transducers which are more energy efficient and produce more usable energy.

Various wind turbine devices have been proposed such as, for example, stationary tornado-type wind turbines for converting wind energy into electrical power. Additionally, stationary Venturi structures have been utilized for driving a radial bladed impeller for driving a shaft connected to an electric generator. The extraction of energy from wind at the surface of the earth is limited by the velocity of the wind at the earth's surface.

A need has thus arisen for an improved wind energy conversion device which is lightweight, cost effective and energy efficient in the conversion process, and which is operable at high altitudes where wind velocity is stronger and more constant than at the earth's surface.

SUMMARY OF THE INVENTION

In accordance with the present invention, a device for generating rotating shaft power from atmospheric air is provided. The device includes an airfoil. A partition is disposed within the airfoil along the length thereof. The partition forms an upper chamber and a lower chamber within the airfoil. The partition includes an aperture creating a fluid communication path between the upper and lower chambers. The leading edge of the airfoil includes an aperture disposed adjacent to the lower chamber. The top surface of the airfoil includes an aperture disposed adjacent to the upper chamber. A turbine is disposed within the partition aperture, and is adapted to be driven by fluid pressure entering the leading edge aperture of the airfoil and exiting the top surface aperture of the airfoil.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
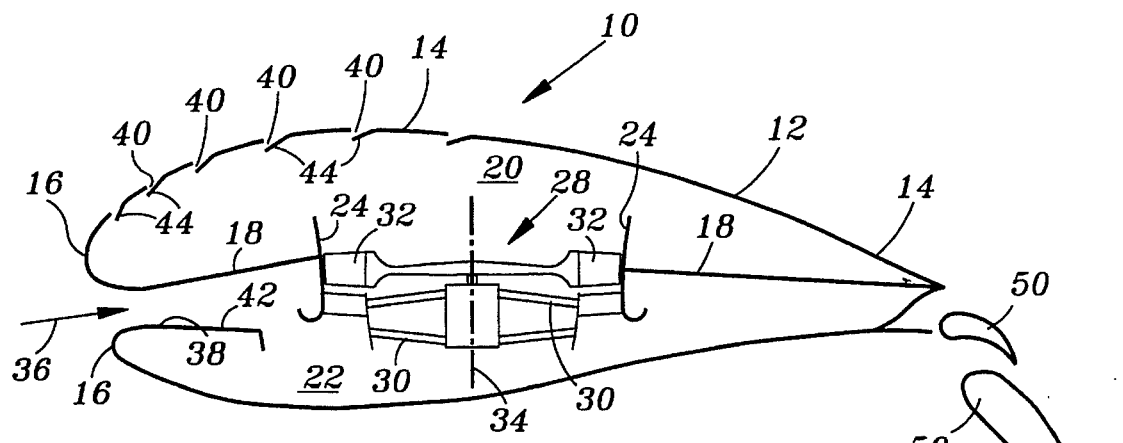
FIG. 1 is a vertical sectional view of the present wind energy device taken generally along sectional line 1—1 of FIG. 2.
Figure 2:
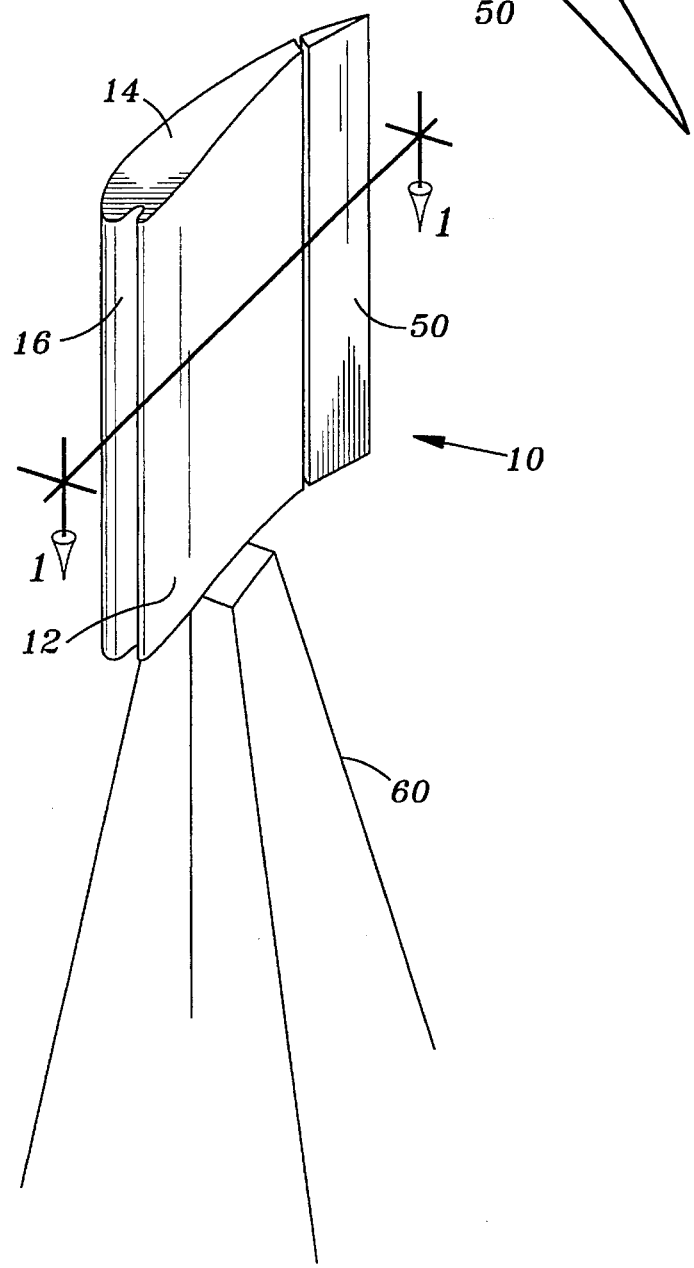
FIG. 2 is a perspective view of the present wind energy device supported in a vertical position.

Referring to FIGS. 1 and 2, the present wind energy conversion device is illustrated in a vertical sectional view, and is generally identified by the numeral 10. Device 10 includes an airfoil 12. Airfoil 12 is generally supported horizontally above the ground, with stabilizers and control devices and is tethered to the ground. Airfoil 12 includes a top surface 14 and a leading edge 16.

Centrally disposed within airfoil 12 is a partition 18. Partition 18 divides airfoil 12 into an upper chamber 20 and a lower chamber 22. Centrally disposed within partition 18 is an aperture 24 which provides a fluid communication path between lower chamber 22 and upper chamber 20.

Disposed within aperture 24 of partition 18 is a vertical axis turbine, generally identified by the numeral 28. Turbine 28 is mounted to partition 18 utilizing support structure 30. Turbine 28 is adapted with blades 32 which rotate about an axis 34.

Airfoil 12 is movable so that it may be positioned such that leading edge 16 faces into the wind indicated by arrow 36. Leading edge 16 of airfoil 12 includes a plurality of apertures 38 immediately below partition 18. A plurality of apertures 40 are formed along top surface 14 of airfoil 12. Apertures 38 may also includes gates 42 for controlling the size of apertures 38. Apertures 40 along top surface 14 of airfoil 12 may include gates 44 for controlling the size of apertures 40 and the air flow therethrough.

In operation of device 10, when airfoil 12 is disposed in the atmosphere, air striking leading edge 16 of airfoil 12 enters apertures 38 creating a high pressure area within lower chamber 22, below partition 18. Because of the low pressure area created over top surface 14 of airfoil 12 due to the design of airfoil 12, a low pressure area is created in upper chamber 20 above partition 18. As a result, there is a pressure differential across turbine 28 which drives blades 32 of turbine 28. The output of turbine 28 is coupled to a shaft disposed along axis 34. Output shaft power may be coupled to various transducer mechanisms to supply electrical, hydraulic or compressive power as desired. Various propeller devices and transducer mechanisms may be used in connection with turbine 28, as is well known to those skilled in the art.

Device 10 operates at an altitude great enough where the wind is strong and reasonably consistent such as, for example, 1,000 feet. The configuration of airfoil 12 is such that turbine 28 takes advantage of the significant pressure differentials produced on airfoil surfaces. The entire shape of airfoil 12 is optimized to produce the lowest possible static pressure in the vicinity of apertures 40 within top surface 14 of airfoil 12.

As previously stated, in operation, chamber 22 and chamber 20 are operated at two distinctly different pressures. Lower chamber 22 operates at approximately the wind dynamic pressure above ambient static pressure. Upper chamber 20 operates at several times the wind dynamic pressure below ambient static pressure. The multiple is a function of, in proportional to, the lift coefficient produced by airfoil 12. At low wind speeds, airfoil 12 is positioned at a high angle of attack, producing a high coefficient of lift, in order to stay aloft. This position results in a pressure differential between the lower chamber 22 and upper chamber 20 which is several times greater than the wind dynamic pressure. At higher wind speeds, airfoil 12 is positioned at a low angle of attack, producing a low coefficient of lift, and the pressure difference between lower chamber 22 and upper chamber 20 is a few times greater than the wind dynamic pressure.

Device 10 operates at a nearly constant pressure difference between lower chamber 22 and upper chamber 20 thereby producing a constant air flow through turbine 28. Turbine 28 extracts a nearly constant power over a significant range of wind speed. Since device 10 is tethered, the angle of attack/lift coefficient can be set greater than is required to simply support airfoil 12. The ability to set the angle provides a useful control over the potential power output of turbine 28.

Airfoil 12 may be further adapted with flaps 50 which increase the low pressure gradient over top surface 14 of airfoil 12 as well as the coefficient of lift. Flaps 50 may thereby increase the pressure differential across turbine 28 to increase the driving power resulting from the flow of wind past device 10.

FIG. 2 illustrates the present device 10 mounted in a vertical position, and supported by a tower 60 supported on the ground. Device 10 is mounted in order to pivot about its vertical axis to optimize energy extraction.

Figure 3:
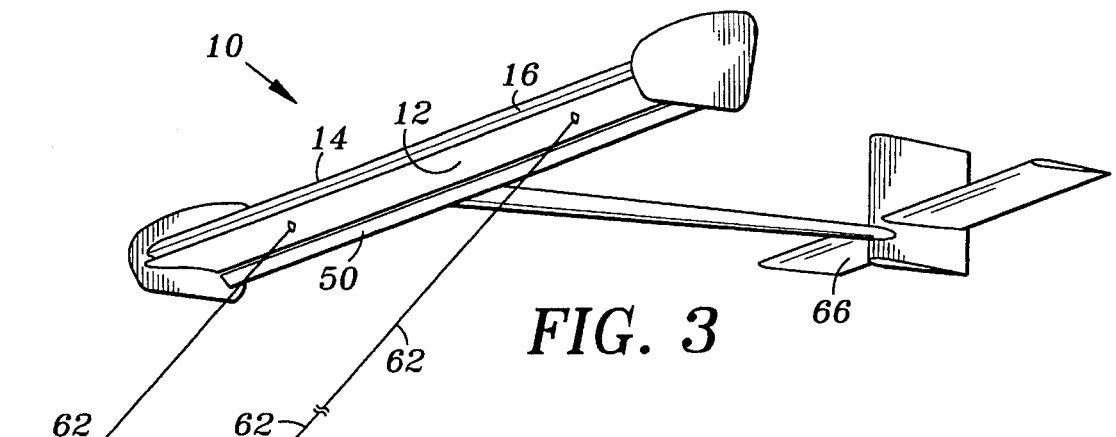
FIGS. 3, 4, and 5 are perspective views of the present wind energy device supported in a horizontal position with various types of aircraft tails.
Figure 4:
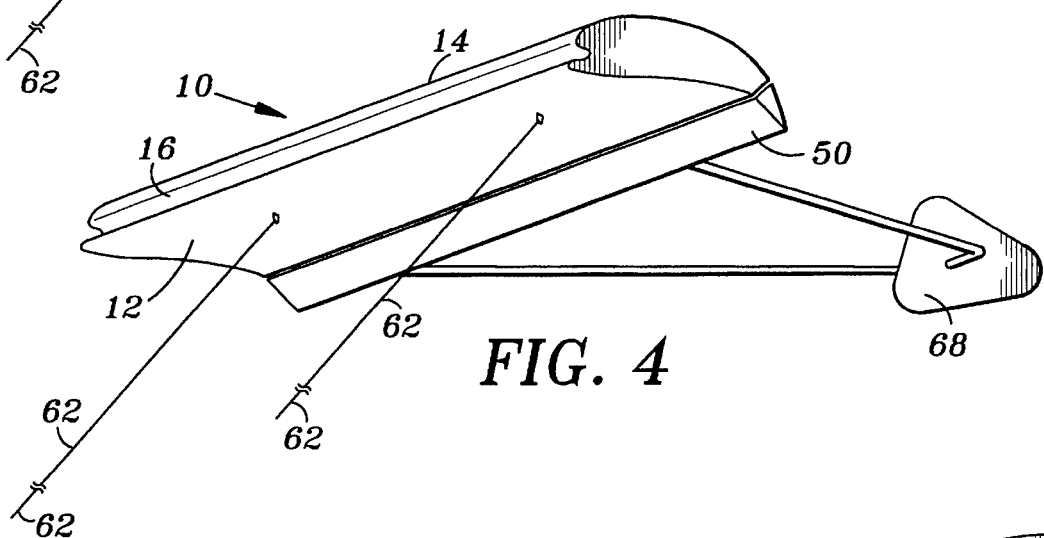
Figure 5:
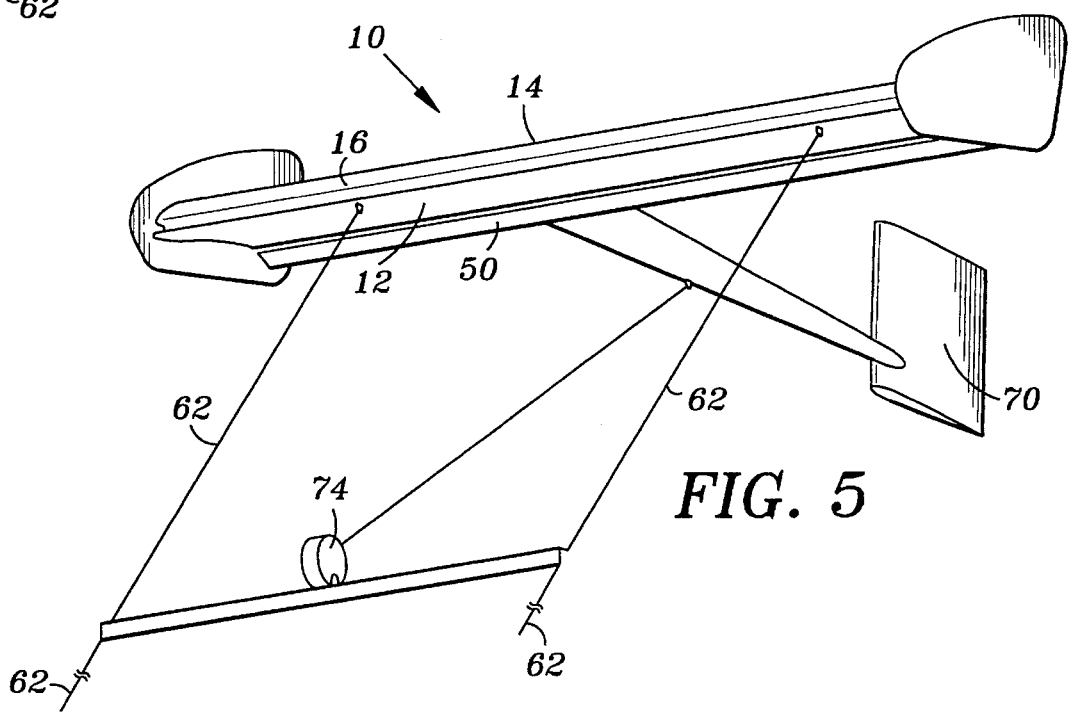

Referring simultaneously to FIGS. 3, 4, and 5, device 10 is mounted in a horizontal position, and is tethered to the ground utilizing lines 62. Various types of stabilizers may be utilized with device 10, such as for example, airplane tail structures 66, 68, and 70 shown in FIGS. 3, 4, and 5, respectively. Such structures 66, 68, and 70 provide stabilization for device 10 when tethered or flown. FIG. 5 further illustrates the use of a reel 74 mounted between line 62 for adjusting the angle of attack of device 10.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A device for generating rotating shaft power from atmospheric air comprising:

an airfoil having a top surface and a leading edge;

a partition disposed within said airfoil along the length thereof, said partition forming an upper chamber and a lower chamber within said airfoil;

said partition including an aperture creating a fluid communication path between said upper and lower chambers;

said leading edge of said airfoil including an aperture disposed adjacent said lower chamber;

said top surface of said airfoil including an aperture disposed adjacent said upper chamber; and a turbine disposed within said partition aperture adapted to be driven by fluid pressure entering said leading edge aperture of said airfoil and exiting said top surface aperture of said airfoil.

2. The device of claim 1 and further including means for tethering said airfoil to the surface of the earth.

3. The device of claim 1 and further including means attached to said airfoil for stabilizing said airfoil in the atmosphere above the surface of the earth.

4. The device of claim 1 wherein said airfoil is supported in a horizontal position with respect to the surface of the earth.

5. The device of claim 1 wherein said airfoil is supported in a vertical position with respect to the surface of the earth.

6. The device of claim 1 wherein said airfoil is supported in a vertical position with respect to the surface of the earth for pivotable movement.

7. A device for generating rotating shaft power from atmospheric air comprising:

an airfoil having a top surface and a leading edge and a trailing edge and being supported above the surface of the earth;

said leading edge of said airfoil including an aperture;

said top surface of said airfoil including an aperture;

a turbine disposed within said airfoil adapted to be driven by fluid pressure entering said leading edge aperture of said airfoil and exiting said top surface aperture of said airfoil when said airfoil is supported above the surface of the earth; and flaps attached to said trailing edge of said airfoil.

8. The device of claim 7 and further including means for tethering said airfoil to the surface of the earth.

9. The device of claim 7 and further including means attached to said airfoil for stabilizing said airfoil in the atmosphere above the surface of the earth.

10. The device of claim 7 wherein said airfoil is supported in a horizontal position with respect to the surface of the earth.

11. The device of claim 7 wherein said airfoil is supported in a vertical position with respect to the surface of the earth.

12. The device of claim 7 wherein said airfoil is supported in a vertical position with respect to the surface of the earth for pivotable movement.

* * * * *